Wallace L. Ikard
Duane E. Soland   Inventors

By John D. Dassett   Attorney

May 25, 1965    W. L. IKARD ETAL    3,185,957
ANALYSIS OF A SEISMIC SIGNAL FOR DETECTION OF A REFLECTED WAVELET
Filed July 27, 1960    2 Sheets-Sheet 2

Wallace L. Ikard
Duane E. Soland    Inventors
By John D. Dassett    Attorney

3,185,957
ANALYSIS OF A SEISMIC SIGNAL FOR DETECTION OF A REFLECTED WAVELET
Wallace L. Ikard, Alexandria, Va., and Duane E. Soland, Minneapolis, Minn., assignors, by mesne assignments, to Esso Production Research Company
Filed July 27, 1960, Ser. No. 45,732
11 Claims. (Cl. 340—15.5)

The present invention relates to a system for processing seismic information and more particularly relates to an improved method for analyzing and recording seismic data for subsequent interpretation. In still greater particularity, the present invention provides a system for detecting and presenting spectrum phase slope information of seismic signals.

The use of seismic methods of prospecting for subterranean deposits of minerals and petroleum deposits are widespread. In essence, such methods include the generation of a seismic shock at or near the earth's surface under such conditions that an elastic wave or seismic shock wave is transmitted downwardly into the earth. Generally, the impulse which sets up the seismic shock wave is produced by the detonation of a high explosive charge in a shot hole drilled in the surface of the earth. However, other methods such as weight dropping, for example, are also used. When a seismic wave thus generated encounters strata or other subsurface discontinuities as it travels downwardly, at least a portion of the energy in the wave is reflected back toward the earth's surface. The wave energy reaching the surface is picked up by one or more seismic transducers such as a geophone positioned in locations spaced from the point where the seismic shock wave was initially generated. The seismic transducers convert the wave motion into electrical energy. Each seismic detector generally receives a number of reflected waves which vary both in magnitude and in arrival time, the variations depending upon the number of discontinuities in the subsurface structure. Due to the many variations in the earth, the electrical energy generated by each detector usually forms a complex type signal varying in amplitude with time and having particularly prominent variations in amplitude at times corresponding to the arrival of reflected waves.

Much useful information concerning the nature and depth of subsurface formations can be obtained by noting the time at which the seismic impulse is initiated and subsequently measuring the time required for the seismic wave to be reflected to the seismic geophone from the subsurface discontinuities. To secure this information, a seismograph is used to record the moment in which the seismic impulse was generated and the time which the reflected wave reaches the detectors. Normally, such a seismograph records the signal from each detector or array of detectors in the form of a separate trace on a seismogram. Each trace thus comprises a record of the variations with the time and the input of the geophone associated with the trace. More recently, it has been the general practice to record each trace in reproducible form such as on magnetic tape, for example.

In analyzing seismic information, the records from a number of seismic transducers or geophone locations are displayed in a manner in which it can be studied by an interpreter. One such manner is the so-called wiggly trace method in which each seismic signal from a geophone location is displayed as a wiggly type or oscillographic type visible trace. The various traces from the various geophone locations are arranged in a side-by-side relationship and in effect form a vertical cross-section of the earth being surveyed. Another type display is the so-called variable density presentation or variable color method. In these methods, the individual seismic signals are reproduced in a manner such that the greater the intensity of the signal the greater the density of the record printed, or alternatively, different intensity of the seismic signal is represented by different colors. In any event, an interpreter studies the seismograph which has been produced and attempts to detect points of interest which are indicative of reflections from subsurface change in strata. As the seismic signals are very complex in nature, they are quite often very difficult to analyze. In many cases, the complex reflection waveforms or wavelets are extremely difficult to distinguish from other waveforms.

It has been found that the phase spectrum associated with the reflection waveform is approximately linear and that the phase slope becomes a minimum at the center of the wavelet. The center of the wavelet is normally the point of greatest interest, normally denoting a subsurface event of particular interest. Analysis of seismic records in terms of spectrum phase slope is useful in any situation and especially valuable in giving sharp time picks from complex reflection waveforms or in detecting reflection waveforms in the presence of noise. The present invention discloses a system of detecting and presenting phase slope information.

Briefly, a preferred embodiment of the invention includes a plurality of parallel filter means with the input of each filter being electrically connected to the seismic signal. The filters are tuned to frequencies spaced throughout a desired frequency range. In a preferred embodiment, the output of each filter is electrically connected to either a peak picker or a valley picker or both which are in parallel. The peak picker is of a type to emit a pulse of a uniform characteristic at each peak of the seismic signal passed through its corresponding filter. The valley picker is likewise of a character to emit a uniform pulse at each valley.

The output from the various peak pickers are added together and preferably are then passed through a threshold circuit. Likewise, the outputs from each valley picker are preferably fed through a threshold circuit. The threshold circuits are adjustable so that only preselected peak coincident levels or valley coincident levels are passed respectively through the threshold circuits. The outputs of the threshold circuits then are added together and displayed or otherwise recorded. In an especially preferred embodiment, delay means are incorporated with each filter means to compensate for unequal filter delays or to adjust the system to the phase character of a desired reflection.

A better understanding of the invention and objects thereof may be had from the following description taken in conjunction with the drawing in which.

Figure 1:
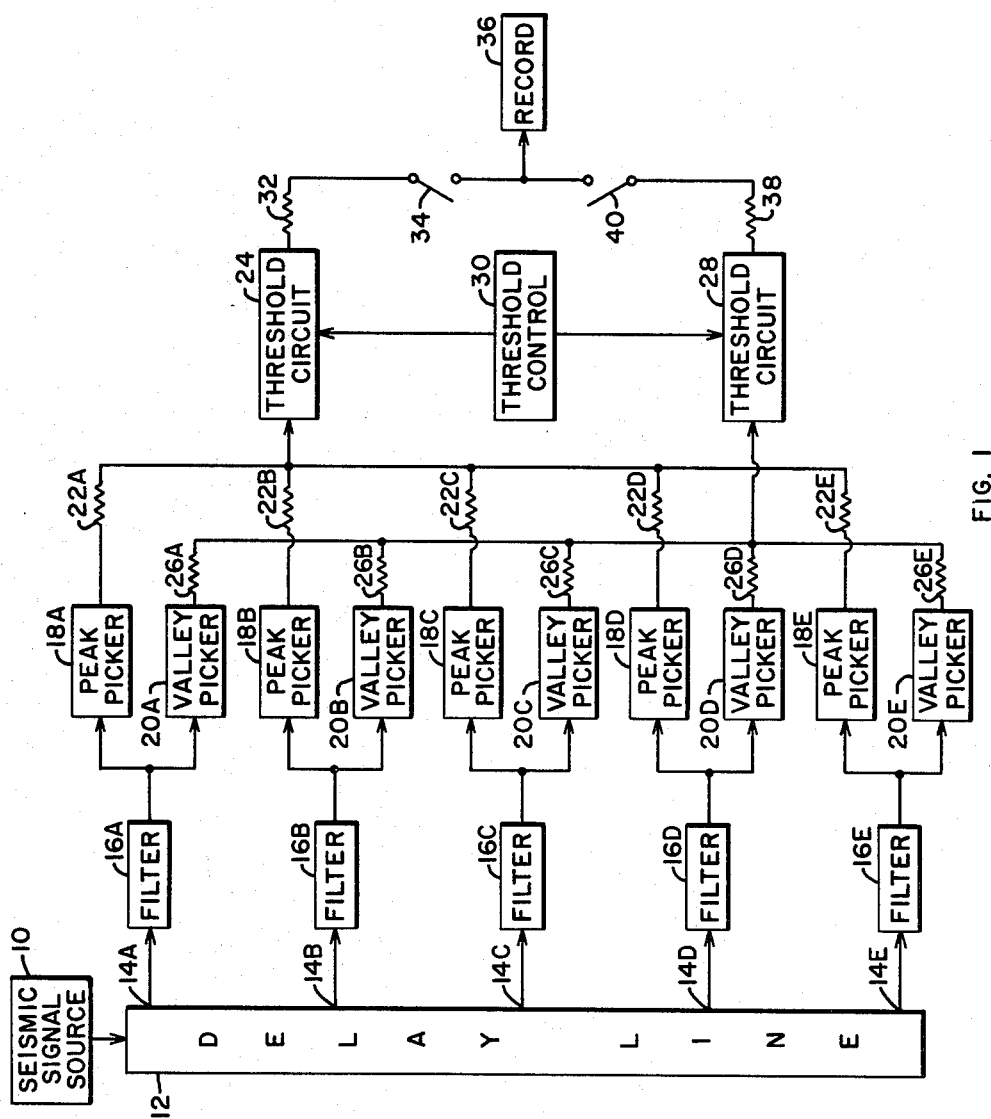
FIG. 1 is a block diagram of an electronic circuit for practicing the invention.

Referring now to FIG. 1, there is illustrated in block diagram form the best mode contemplated for carrying out this invention. The seismic signal to be processed is supplied from seismic source 10. Seismic source 10 may be direct from a geophone location but will ordinarily be from a reproducible record such as a magnetic tape. The seismic signal from seismic source 10 is fed to a delay line 12. Delay line 12 has a series of taps so that various delays in the seismic signal can be obtained. It is anticipated that a suitable delay line would have delay taps which delay the seismic signal from about 2 milliseconds to about 20 milliseconds. However, under certain conditions it might be desired to have different delay taps outside this range. Connected to delay taps 14A, 14B, 14C, 14D and 14E, respectively, are filters 16A, 16B, 16C, 16D and 16E. The filters are selected as may be desired and are tuned to selected frequencies spaced throughout the signifificant frequency range, which for seismic prospecting is normally in the range of about 20 to 40 cycles per second. The required frequency range may be determined by a number of means, such as Fourier analysis of selected reflection waveforms, or by observing the bandpass filter settings which produce more readily interpretable results in playback of the seismic records into conventional wiggly trace or variable density form.

There are shown five filters in FIG. 1; however, this number may be varied to enable the more important frequency components of a signal to be separated. The output of filters 16A through 16E are fed to peak pickers 18A through 18E and valley pickers 20A through 20E, respectively. The peak pickers and valley pickers for each filter are in parallel. The peak picker circuits are circuits which are of a character to provide a separate output pulse corresponding to the peak time of its associated filter output signal. The valley picker likewise is a circuit which provides a separate output pulse for each corresponding valley time of its associated filter output signal. The duration of the output pulses are preferably adjustable. By the term "peak" it is meant that point in time when the signal reaches a maximum and then begins to decrease. By "valley" it is meant that point of the seismic signal when the ampltiude reaches a minimum and starts to increase. Each frequency component of a seismic signal for each filter will have many peaks and valleys. For a discussion of peak picker circuits or valley picker circuits, attention is directed to "Waveforms" by Chance et al., published by McGraw-Hill Book Company, Inc., New York, N.Y., beginning on page 348. The output pulse from each peak picker circuit is of the approximate same amplitude and for approximately the same duration. It has been found that a desirable time duration for the output pulses from the peak pickers and the valley pickers is approximately between about .003 to .010 millisecond but may in some case be longer. The output pulses from each valley picker are of the same ampliude and for the same duration in time. The coincidence parameters of the system can also be controlled by setting the width of the peak and valley output pulses.

The outputs from peak pickers 18A through 18E are fed through adding resistors 22A through 22E to threshold circuit 24. The outputs from valley pickers 20A through 20E are fed through adding resistors 26A through 26E to threshold circuit 28. Threshold circuit 24 is of a character to pass therethrough only pulses exceeding a selected peak coincident level. Likewise, threshold circuit 28 is of a character to pass therethrough only pulses less than a selected valley coincident level. The threshold circuits may be conveniently controlled by a control circuit 30. The output of threshold circuit 28 is fed through adding resistor 38 through switch 40 to record or record means 36. Switches 34 and 40 are provided in event it is desired to record only the peak pulses or the valley pulses separately.

Figure 2:
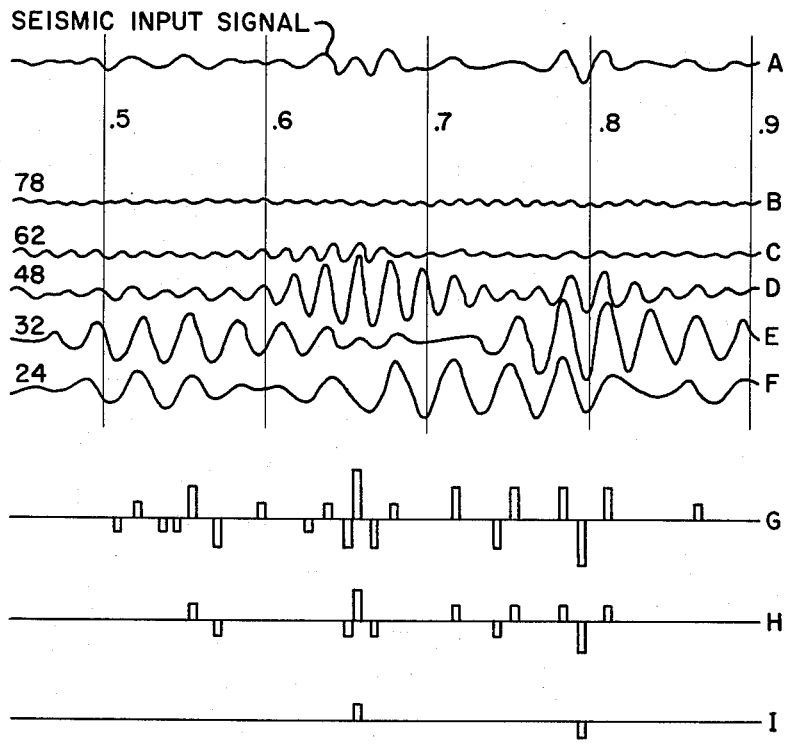
FIG. 2 is a group of curves representing waveforms obtained in the practice of the invention; and, FIG. 3 illustrates a seismogram showing reflection points illustrating the system of the invention.

For better understanding of this invention, attention is now directed toward FIG. 2 which illustrates a group of waveforms produced from a seismic signal. Shown on FIG. 2 is a curve A representing a seismic signal which is to be processed in an apparatus as shown in FIG. 1. Waveforms B, C, D, E and F represent the output of filter means 16A through 16E, respectively. To obtain the waveform shown in FIG. 2, filters 16A through 16E were set at 78 cycles per second, 62, 48, 32 and 24, respectively. The half-voltage band width of each of these filters was approximately 16 cycles per second. The frequencies of the filters were selected to cover the significant frequency content of the reflection wavelets. Delay tap settings 14A through 14E were chosen to equalize the delays of the associated filters. Waveform A was fed to delay line 12 and waveforms B, C, D, E and F were picked off at delay taps 14A, 14B, 14C, 14D and 14E, respectively. Waveform B represents the signal from filter 16A; waveform C represents the signal from filter 16B; waveform D represents the signal from filter 16C; waveform E represents the signal from filter 16D and waveform F represents the signal from filter 16E. The phase of each of the various frequency components leaving the filters is the same as their respective phase in the "original" seismic signal. The signal from filter 16A was fed to peak picker 18A and valley picker 20A; the signal from filter 16B was fed to peak picker 18B and valley picker 20B; the signal from filter 16C was fed to peak picker 18C and valley picker 20C; the signal from filter 16D was fed to peak picker 18D and to valley picker 20D; and the signal from filter 16E was fed to peak picker 18E and valley picker 20E. The outputs of peak pickers 18A through 18E were fed to threshold circuit 24 and the outputs of valley pickers 20A through 20E were fed to threshold circuit 28.

Waveforms B, C, D, E and F were passed through their respective peak pickers and valley pickers and a pulse for each valley and for each peak was passed to threshold circuit 24 and threshold circuit 28, respectively. With the output signal of the threshold circuits set at 2, waveform G was recorded on record 36. By threshold circuit set at 2, it is meant that if two or more peaks and valley pulses representing peaks are coincident in time they would add and a pulse of amplitude of unity would pass therethrough. That is, one pulse of unity amplitude would not pass, but that part of the added pulses exceeding unity amplitude would pass.

Waveform H represents a threshold setting of 3. That is, if three or more pulses align all added pulses exceeding an amplitude of twice unity would pass therethrough. Waveform I represents the threshold set at 4. That is, four of the peaks or valleys of the five signals—B, C, D, E and F—have to align in time before any pulse is shown on waveform I. It will be noted that at about .66 second of record time, four of the five peaks are aligned. This is seen then to be the center of the wavelet of the reflection event of the seismic signal shown in waveform A. At about .8 second, valleys of four of the signals, namely C, D, E and F align when the threshold coincidence is set at 3, it is thus seen that waveform I is recorded on the record means 36. The pulse representing the center of the wavelet at .66 and at .8 second is very easily and quickly determined. The two points are the center of the two wavelets of interest in the portion of seismic signal A. Extraneous "wave," noise, etc., are not present in waveform I.

Figure 3:
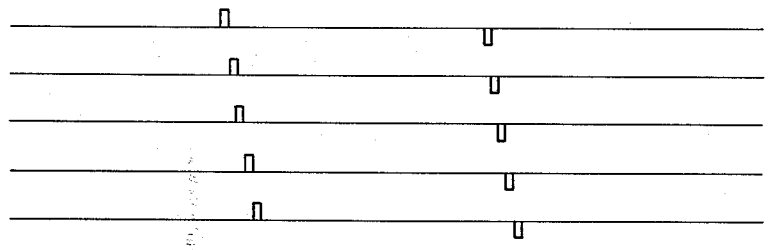

In the illustration in FIG. 2 only one seismic signal was considered. However, in actual operation as many such seismic signals would be considered as necessary to make a desired seismogram. In FIG. 3, there are shown five signals processed in accordance with this invention. The waveforms shown are similar to waveform I of FIG. 2. It is thus quickly seen that the only signals or events illustrated thereon are those which are representative of the center of the wavelets or reflection points of interest.

It will be understood that the apparatus and system contained in the above description are merely representative or illustrative and are not limited and that numerous modifications may be made therein without departing from the scope of the invention.

What is claimed is:

1. An apparatus for processing a seismic signal comprising in combination: a plurality of parallel filters with the input of each such filter being connected electrically to the seismic signal, said filters being tuned to different frequencies spaced throughout a desired frequency range; delay means incorporated with each said filter to compensate for unequal filter delays; a peak picker means electrically connected to the output of each said filter to emit a square pulse of a preselected width at each peak; and means to add the outputs from the peak picker means for said filters.

2. A system for processing a seismic signal which comprises in combination: a seismic signal source; a delay line electrically connected to said source, said delay line having a plurality of take-off taps delayed in time one from the other; a plurality of filters with each said filter having a preselected bandpass different from the other filters and each said filter being electrically connected to a tap on said delay line to compensate for the delay in each said filter such that the output of each said filter is in the same phase relation as was present in the original seismic signal; means connected to the output of each said filter and of a character to detect a zero slope of the signal passed from each said filter and to generate a square wave pulse of a preselected width upon detection of each such zero slope; and means to add the outputs of such detector means.

3. A system for processing a seismic signal which comprises in combination: a seismic signal source; a plurality of parallel filter means electrically connected to said seismic signal source, each such filter means being tuned for a different frequency from the others; delay means incorporated with each said filter means; means connected to the output of each said filter means and of a character to detect a zero slope of the signal passed from said filter means and being further of a character to generate a square wave pulse of a preselected width and amplitude upon detection of each said zero slope; and means to add the outputs of each such detector means.

4. An apparatus for processing a seismic signal comprising in combination: a plurality of parallel filters tuned to different frequencies with the input of each such filter being electrically connected to the seismic signal; delay means incorporated with each said filter; a plurality of detector means with a detector means connected to the output of each said filter and of a character to detect a zero slope of the signal passed from each said filter and to generate a square wave pulse of a preselected width upon detection of each such zero slope; adding means to add the outputs of such detector means; threshold means connected to the output of said adding means and of a character to pass therethrough only that part of a signal fed thereto which is either above a preselected positive value or below a preselected negative value.

5. An apparatus as defined in claim 4 including means to record the output from said threshold circuit means.

6. An apparatus for processing a seismic signal comprising in combination: a plurality of parallel filters having different selected frequencies with the input of each such filter being connected electrically to the seismic signal; delay means incorporated with each said filter; a peak picker means electrically connected to the output of each said filter and of a character to emit a square pulse of preselected width and amplitude at each peak; first adding means to add the output from said peak picker means; valley picker means electrically connected to the output of each said filter and of a character to emit a square pulse of a preselected width and height at each valley; second adding means to add the output from the valley picker means for each said filter; a first threshold circuit electrically connected to said first adding means and of a character to pass therethrough only that portion of the signal fed to it which is above a selected value; second threshold circuit means electrically connected to said second adding means and of a character to pass therethrough only that part of the signal fed to it which is below a preselected negative value; third adding means to add the output from said first threshold circuit means and said second threshold circuit means; and means to record the output from said third adding means.

7. An apparatus for processing a seismic signal comprising in combination: a seismic signal source; a plurality of parallel filters tuned to different frequencies and each connected to said seismic signal source; slope detecting means connected to the output of each said filter and of a character to generate a pulse at a zero slope of the signal passed from said filter; adding means to add the output of each slope of detector means; and recording means to record the outputs of said adding means.

8. An apparatus as defined in claim 7 including a threshold circuit means connected to the output of said adding means and before said recording means and of a character to pass therethrough only that part of the signal fed thereto which is either above a preselected positive value or below a preselected negative value.

9. A method of analyzing a seismic signal which comprises: separating the seismic signal into a plurality of frequency components spaced over a selected spectrum; detecting transient significant characteristics in each frequency component; and generating a pulse upon the simultaneous detection of such significant characteristics in at least two frequency component signals.

10. A method of analyzing a composite seismic signal which comprises: separating the seismic signal into selected frequency component waveforms, such frequency component waveforms being time-wise aligned similarly as in the composite seismic signal; detecting the occurrences of a transient significant characteristic in each frequency component waveform; generating a pulse upon the simultaneous detection of such significant characteristics in a predetermined member of such frequency component waveform; and recording the pulses thus generated.

11. An apparatus as defined in claim 10 in which the significant characteristics detected are peaks in the frequency component waveforms.

References Cited by the Examiner
UNITED STATES PATENTS

| | | | |
|---|---|---|---|
| 2,767,388 | 10/56 | Rust | 340—15 |
| 2,941,184 | 6/60 | Moody | 340—15 |
| 2,944,620 | 7/60 | Van Dijck | 340—15 |

SAMUEL FEINBERG, *Primary Examiner.*
IRVING L. SRAGOW, CHESTER L. JUSTUS,
*Examiners.*